Sept. 20, 1938.  O. KREMMLING  2,130,887
DOUGH MOLDING MACHINE
Filed Oct. 7, 1935  2 Sheets-Sheet 1
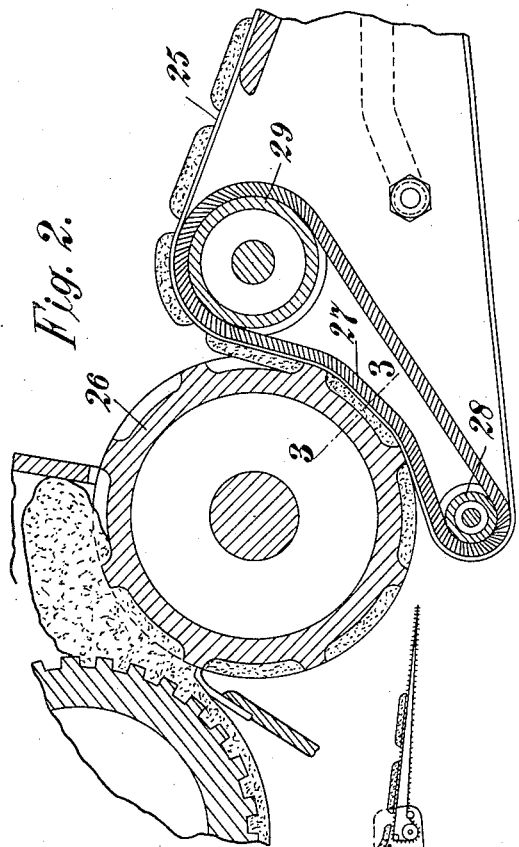
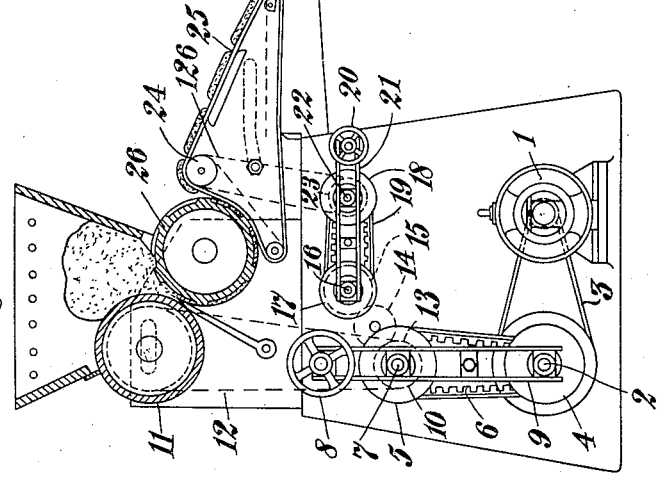
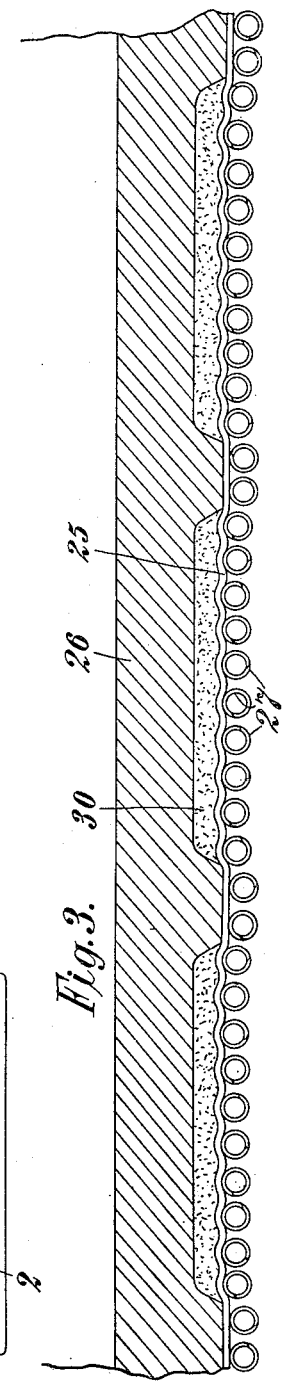
OTTO KREMMLING
INVENTOR
BY George B. Willens
ATTORNEY

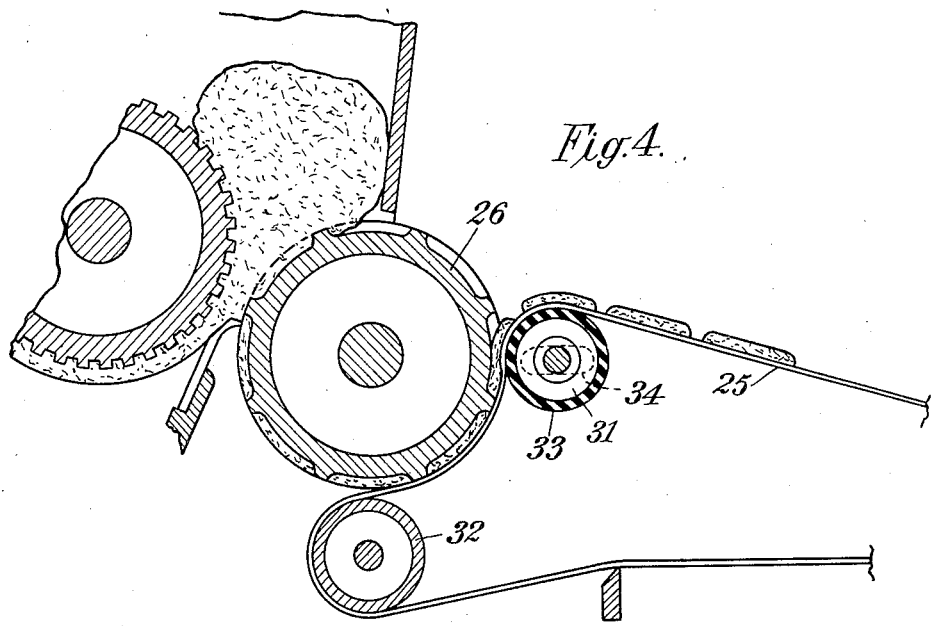
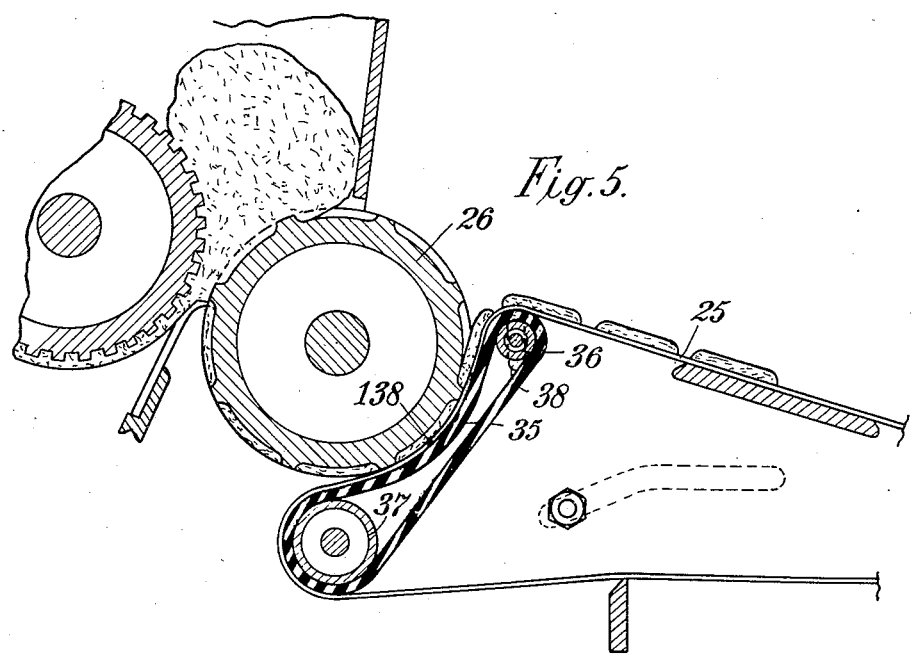

Patented Sept. 20, 1938

2,130,887

UNITED STATES PATENT OFFICE 2,130,887

DOUGH MOLDING MACHINE

Otto Kremmling, Hamersleben, Germany

Application October 7, 1935, Serial No. 43,837
In Germany October 8, 1934

3 Claims. (Cl. 107—8)

This invention relates to machines for molding plastic materials (hereinafter referred to as dough) such as biscuit shapes and comprising a rotary drum having mold recesses into which the dough is forced under compression and from which the dough shapes are extracted by means of an endless discharge band or conveyor having a lap which envelops a portion of the periphery of the drum.

An object of the invention is to provide improvements associated with the discharge band or its equivalent such as a baking tray whereby the discharge of the dough shapes is facilitated so that a complete and effective discharge of the biscuit shapes is obtained.

It has been found that when the discharge web for the dough shapes is driven at a linear speed equal to the peripheral speed of the molding roll, difficulties may occur in starting the release or discharge of the dough shapes. According to the invention means are provided whereby this difficulty is overcome. This is effected by running the discharge web at a speed which is slightly less than the peripheral speed of the molding roll whereby a rearward displacement of the leading edge of the biscuit shape is obtained which is effected as it were by slight compression of the dough shape along its plane so that the leading edge is drawn away from the surface of the mold recess. The leading edges of the dough shapes are thus automatically detached from the front portion of the mold edge so that there is a more effective adherence of the dough shapes to the discharging conveyor web. By means of this improved method of discharging it is possible to deal with sticky and short doughs in the dough molding machine and nevertheless obtain an easy release of the molded and embossed dough pieces from the molds.

The relative speeds between the discharge web and the molding roll may be obtained in any convenient manner so as to impart the desired slightly lower speed of the discharge web. For example an infinitely variable speed gear may be provided for driving the discharge web. Again, the drive may be effected by means of toothed gearing, by the provision of change gear wheels; alternatively the transmission ratio may be definitely fixed so that the desired difference in speed between the molding roll and the discharge web is determined by the nature of the dough under treatment, as to whether this is firm or tough, or short or soft.

The slight compression of the dough shapes along their plane, it will be found has very little or no effect at all upon the appearance of the product, particularly if the molds are made slightly longer than is necessary.

In the accompanying diagrammatic drawings

Fig. 1 is a side elevation of a dough molding machine having a discharge conveyor operated according to the invention.

Fig. 2 is a partial view of the molding roll and discharge conveyor having additional means for aiding in the discharge of the biscuit from the molding roll.

Fig. 3 is a cross section to an enlarged scale on the line 3—3 of Fig. 2.

Figures 4 and 5 are views similar to Fig. 2 showing further means associated with the discharge web for ensuring discharge of the dough shapes from the mold recesses.

In applying the invention to a dough molding machine of the type shown in my application for U. S. Letters Patent, Serial No. 32,505, filed July 22, 1935, a motor 1 is provided which drives a shaft 2 by means of a belt drive 3. The shaft 2 forms the driving shaft of a variable speed gear comprising cone pulleys 4 and 5 and a driving belt 6. The pulley 5 is mounted on the driven shaft 7. An adjusting wheel 8 is provided by which the pivotally mounted frames 9 may be adjusted to vary the effective diameters of the cone pulleys 4 and 5 whereby the speed of the driven shaft 7 relatively to the driving shaft 2 may be varied as desired. The shaft 7 is provided with a sprocket wheel 10 by which the pressure roll 11 of the molding apparatus is driven through the chain 12. There is also a spur wheel 13 on the shaft 7 which meshes with an idler wheel 14 and thus drives a gear wheel 15 on the shaft 16. The shaft 16 forms a driving shaft of a second variable speed gear comprising cone pulleys 17 and 18 and belt 19. This second variable speed gear is provided with an adjusting wheel 20 and side frames 21 by which the effective diameters of the cone pulleys may be adjusted for varying the relative speeds of the driving shaft 16 and driven shaft 22. The shaft 22 is provided with a chain wheel 23 by which the driving roll 24 of the take-off conveyor 25 is driven through the chain 26. The take-off or discharge conveyor is mounted and arranged as described in my copending application referred to above.

By a suitable adjustment of the second variable speed gear 17, 18, 19 the lineal speed of the discharge web 25 may be determined in relation to the molding roll 26, the speed of the web being arranged so that it is slightly less than the peripheral speed of the molding roll. The lineal speed of the web is determined by the nature of the dough or other substance to be treated and also by the size of the goods to be produced. It will be appreciated that by the drive for the discharge web above described the speed of such web is independent of the rotary movement of the molding roll 26.

In operation as the dough shapes in the mold recesses come into engagement with the overlapping portion of the discharge conveyor 25 their leading edges will be pressed rearwardly with relation to the direction of movement of the molding roll owing to their adhesion to the discharge web. Such action will cause the dough shapes to be removed from the leading edge of the mold recess so that as the movement progresses they will readily be removed from the molding roll as the discharge web and periphery of the molding roll diverge. As the mold recesses are filled under pressure it will be appreciated that the dough shapes will protrude somewhat from the molding recesses to ensure a surface contact between the dough shapes and the discharge web and thus produce the desired adhesive action.

It may be desirable in connection with the discharge web of the apparatus to provide additional pressure of the web against the molding roll over the length of contact therewith and according to a further feature of the invention such additional pressure may be obtained by the provision of a series of endless tensioning means mounted in contact with the rear of the discharge web where it engages with the molding roll. Such series is disposed transversely of the discharge web and act to force the web on to the roll and thus aid in the production of an even adherence of the dough pieces to the discharge web over the entire surface of each dough piece. It is thus made possible to deal with most difficult doughs and to ensure a complete and clean removal of the dough shapes from the molding roll.

A convenient arrangement according to this feature is illustrated in Figures 2 and 3. The discharge web 25 makes a contact with the molding roll 26 over a considerable portion of the periphery and acts thereon with a certain compressive force according to the tension of the web. The pressure of the web 25 is increased according to the invention by a series of individual elastic elements 27 which preferably comprise endless wire spiral elements. These elastic elements are arranged side by side on the supporting and driving rolls 28 and 29 and are provided with an initial tension. As will be observed from Fig. 3 the action of the elastic elements causes a penetration of the discharge web 25 into the mold depressions, each elastic element operating independently of the adjacent elements. Their individual action is unhindered by any cross connecting means such as would be obtained by a broad compression band. The elastic elements thus exert an even pressure on the outer surface of the molded dough pieces 30 so that there is complete surface contact between the latter and the discharge web, producing an even adherence to the web and a clean and complete withdrawal of the dough shapes from the molds.

According to a further feature of the invention which is particularly suitable in connection with very firm dry doughs having a very small fat content so that they only adhere with great difficulty to the discharge band, means may be provided for creating an excess pressure during the final stages of the extraction of the dough pieces from the mold recess. According to one arrangement a flexible element such as a rubber sleeve may be provided around the upper guide roll for the discharge band and the roll may be adjusted in relation to the molding roll. By these means an intimate contact of the discharge band with the dough piece in the final discharge position is obtained so that the dough piece completely adheres to the discharge band and detachment of the dough pieces from the mold recesses is effected with certainty.

It will be appreciated that the additional pressure is only required when the rear end of the mold recess reaches the discharge position as the front edge of the dough piece has already been drawn back from the mold edge by the slower motion of the discharge band.

In some cases it may be desirable to provide the excess pressure over the whole length of contact of the discharge band with the molding roll and in order to attain this result a strong endless rubber band may be arranged over the upper and lower guide rolls so that a lap of the rubber band engages the portion of the discharge band contacting with the molding roll. This rubber band will provide the additional pressure by its own inherent tension and cause the discharge band always to remain in intimate contact with the dough pieces. The inherent tension of the rubber band may be increased by an adjustment of the upper guide roll.

With this form of the invention certain advantages may be obtained over the previously described arrangement shown in Figures 2 and 3. It will be appreciated that with individual elastic elements 27 markings may be produced on the under surface of the biscuits—see Fig. 3. These markings will be avoided with the form of the invention in which a rubber sleeve or band extending the whole width of the discharge web is provided as in Figures 4 and 5, as the pressure exerted by the full width band will be evenly distributed over the dough pieces instead of along parallel lines as in the form in Figures 2 and 3.

The full width compression band also has the advantage that the discharge band, which has a rate of travel less than the peripheral speed of the molding roll, may have a substantially smooth surface so that any marking of the dough piece by the weave or mesh of the discharge web is rendered practically imperceptible. At the same time even when using very smooth discharge bands owing to the pressure exerted by the rubber sleeve or band the discharge of very firm dry doughs having slight adhesive quality is made certain.

Referring to Figs. 4 and 5 which illustrate two modes of carrying this part of the invention into effect, the molding roll 26 (Fig. 4) contacts over considerable surface with the discharge web 25, the latter being guided by the rolls 31 and 32. A rubber sleeve 33 is provided on the guide roll 31 and the latter may be adjusted with relation to the molding roll 26 by mounting its bearings in the slots 34. When treating very firm dry doughs the roll 31 is adjusted in respect to the molding roll 26 so as to cause an additional pressure on the dough to be exerted by the discharge web during the last portion of the discharge of the dough piece.

According to the arrangement shown in Fig. 5 whereby an intensive compression is exerted during the whole of the contact of the discharge web 25, an endless rubber band 35 of the full width of the discharge band is provided and is mounted upon the upper and lower guide rolls 36 and 37. The rubber band 35 is given an initial tension so that it presses upon the enveloping lap 38 of the discharge web and thus causes an intimate contact between the latter and the dough shapes. The tension of the rubber band 35 and consequently the pressure of the discharge web on the dough pieces may be varied by adjusting the bearings of the upper guide roll 36 in the slot 38. By this means the compression can be increased, if necessary, to the desired extent so as to ensure certain release of the dough shapes in the case of very dry doughs, without the under surface of the dough shapes showing any marking whatsoever.

Having now described my invention what I claim as new and desire to secure by Letters Patent is:

1. A dough molding machine comprising a rotary molding drum having molding recesses in its periphery, and an endless discharge web having a lap enveloping a portion of the periphery of the drum, upper and lower guide rolls for the web and pressure means for pressing said lap of the web against the drum, said means comprising a transverse series of endless flexible elements supported by said rolls and engaging the back of said lap.

2. A dough molding machine comprising a rotary molding drum having molding recesses in its periphery an endless discharge web having a lap enveloping a portion of the periphery of the drum and means for pressing said lap against the drum, said means acting along a series of laterally spaced lines extending lengthwise of the lap.

3. A dough molding machine as claimed in claim 2, wherein the pressure applying means comprises a plurality of endless spiral wire elements which are mounted in position with an initial tension.

OTTO KREMMLING.